: US 7,137,464 B2
(45) Date of Patent: Nov. 21, 2006

(12) United States Patent
Stahler, Sr.

(10) Patent No

(54) STAIR CLIMBING HAND TRUCK

(75) Inventor: Richard D. Stahler, Sr., Mantua, NJ (US)

(73) Assignee: Wesco Industrial Products, Inc., Lansdale, PA (US)

( * ) Notice: Subject to any disclaimer, the term of this patent is extended or adjusted under 35 U.S.C. 154(b) by 0 days.

(21) Appl. No.: 10/941,252

(22) Filed: Sep. 15, 2004

(65) Prior Publication Data

US 2006/0054367 A1     Mar. 16, 2006

(51) Int. Cl.
B62D 51/06     (2006.01)
(52) U.S. Cl. .................................... 180/8.2; 280/47.27
(58) Field of Classification Search ................ 180/8.2, 180/9.22, 9.32, 9.62, 9.64; 280/5.22, 47.27
See application file for complete search history.

(56) References Cited

U.S. PATENT DOCUMENTS

| | | | | |
|---|---|---|---|---|
| 2,917,120 | A | * | 12/1959 | Gates et al. ................ 180/9.36 |
| 3,061,323 | A | | 10/1962 | Tittes |
| 3,149,688 | A | * | 9/1964 | Russell ...................... 180/9.22 |
| 3,288,234 | A | | 11/1966 | Feliz |
| 3,330,370 | A | | 7/1967 | Morton |
| 3,362,496 | A | | 1/1968 | Landry |
| 3,494,440 | A | | 2/1970 | Hanson |
| 3,515,401 | A | | 6/1970 | Gross |
| 3,713,501 | A | | 1/1973 | Hurt |
| 3,734,518 | A | | 5/1973 | Sawmiller et al. |
| 3,907,138 | A | | 9/1975 | Rhodes |
| 4,109,740 | A | | 8/1978 | Andruchiw |
| 4,960,179 | A | | 10/1990 | Leach |
| 5,036,929 | A | | 8/1991 | Trougouboff |
| 5,195,762 | A | | 3/1993 | Pressly |
| 5,253,881 | A | | 10/1993 | Dunkle |
| 5,741,169 | A | | 4/1998 | Chen |
| 6,095,531 | A | | 8/2000 | Khachatoorian |
| 6,123,162 | A | | 9/2000 | Rodriguez et al. |
| 6,164,398 | A | | 12/2000 | Alber |

OTHER PUBLICATIONS

Escalera Inc., Stair Climbing Handtrucks and Stair Climbing Forklifts—MODELS-, http://www.escalera.com/models/models.htm; 3 pages (Feb. 13, 2006).
Escalera Inc., Stair Climbing Handtrucks and Stair Climbing Forklifts—Stair Climbing-, http://www.escalera.com/stairclimbing/stairclimbingmenu.htm; 1 page (Feb. 13, 2006).
Escalera Inc., home page, http://www.escalera.com/index.htm; 2 pages (Feb. 13, 2006).

* cited by examiner

Primary Examiner—Tony Winner
(74) Attorney, Agent, or Firm—Akin Gump Strauss Hauer & Feld, LLP

(57) ABSTRACT

A hand truck for climbing stairs includes a frame having handles proximate a first end and at least two wheels proximate a second end. A stair climbing mechanism is engaged with the frame proximate the second end. The stair climbing mechanism has a motor and an output shaft having two ends drivingly connected thereto. At least two rotatable endless loop drive elements, generally parallel with respect to each other, are drivingly connected to the output shaft, one drive element at each end thereof. Each drive element includes at least one abutment member engaged with and extending outwardly therefrom. The motor drives the drive element to cause rotation of the abutment members, which interact with the stairs to lift the hand truck up the stairs.

2 Claims, 4 Drawing Sheets

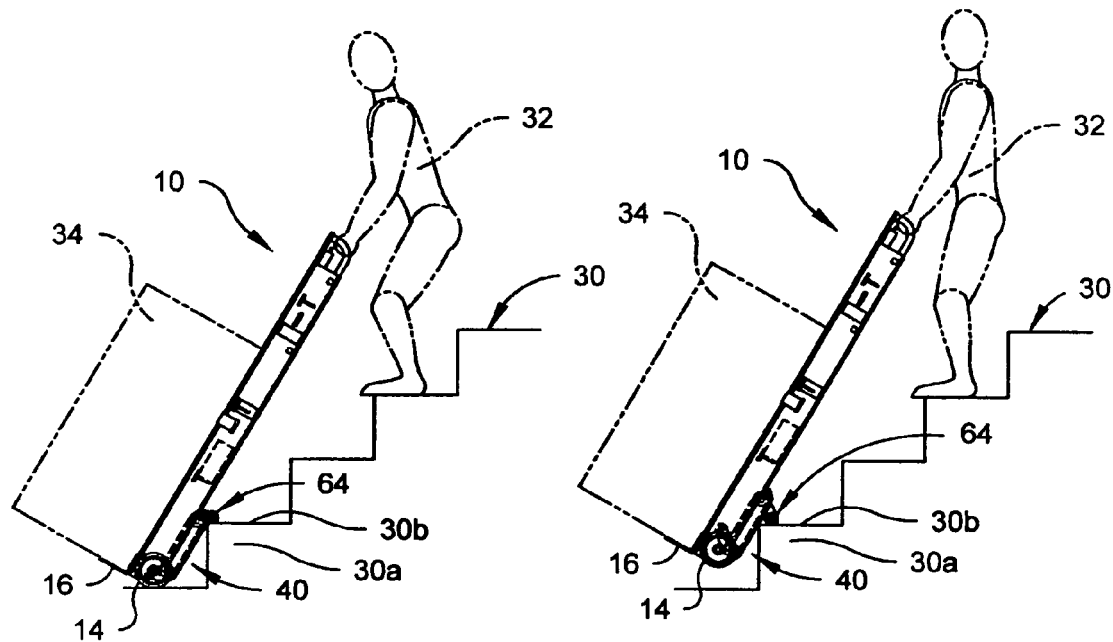
*Fig. 4A*  *Fig. 4B*
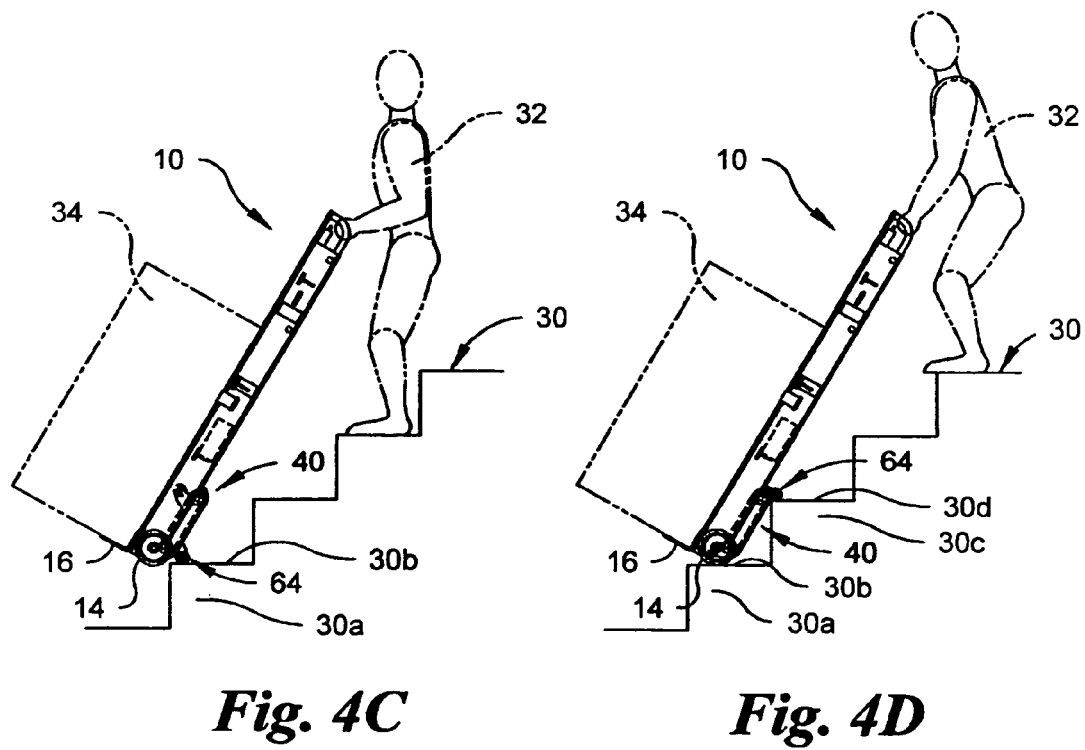
*Fig. 4C*  *Fig. 4D*

STAIR CLIMBING HAND TRUCK

BACKGROUND OF THE INVENTION

The present invention relates generally to hand trucks, and, more particularly, to hand trucks having motorized stair climbing capability.

Hand trucks are generally well known and typically have a ladder-like frame having a handle at a top end and wheels at a bottom end thereof. A generally perpendicular platform or plate typically extends from the frame proximate the bottom end. The platform is typically used to support objects during transportation thereof using the hand truck.

Stair climbing hand trucks are also generally known. Typically, such stair climbing hand trucks include some form of motorized stair climbing mechanism. Typically, stair climbing mechanisms include an electrically powered motor having an output shaft which is drivingly connected to stair climbing feet. The feet are generally rotatable about a path which allows the feet to be placed on successive stairs in a flight of stairs, allowing the mechanism to lift the hand truck up one stair at a time until the hand truck reaches the top of the flight of stairs.

A typical problem with such conventional stair climbing hand trucks is that they have only one connection between the output shaft and the rest of the stair climbing mechanism. Because of this, if a failure of the drive connection occurs (i.e., a belt or chain drivingly connecting the output shaft with the rest of the stair climbing mechanism breaks or otherwise fails), the stair climbing hand truck, having no redundant or backup system, is left powerless. If the failure occurs during stair climbing, the powerless hand truck is left to potentially fall down the stairs. This creates a potentially dangerous situation to the operator of the stair climbing hand truck, who could potentially be dragged down the stairs by the falling hand truck, as well as anyone who happens to be following the stair climbing hand truck up the stairs.

Therefore, it is desirable to have a stair climbing hand truck with a redundant drive system, such as an output shaft that has two drive connections that drivingly engage the rest of the stair climbing mechanism. In this way, if one of the drive connections between the output shaft and the rest the stair climbing mechanism were to break, because of the continued operation of the second drive connection, the stair climbing hand truck would not be rendered powerless.

BRIEF SUMMARY OF THE INVENTION

Briefly stated, the present invention is a hand truck for climbing stairs. The hand truck comprises a frame having handles proximate a first end and at least two wheels proximate a second end. The frame further has a lifting surface extending outwardly from the frame proximate the second end. A stair climbing mechanism is engaged with the frame proximate the second end and has a motor. An output shaft is drivingly connected to the motor. The output shaft has two ends. At least two rotatable endless loop drive elements are generally parallel with respect to each other. The drive elements are drivingly connected to each of the ends of the output shaft. Each drive element includes at least one abutment member engaged with and extending outwardly therefrom, whereby the motor drives the drive elements to cause rotation of the abutment members. The abutment members interact with the stairs to lift the hand truck up the stairs.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings:

FIGS. 4A–4D are left side elevational views of the stair climbing hand truck of FIG. 1 climbing up a stair of a flight of stairs.

DETAILED DESCRIPTION OF THE INVENTION

Figure 1:
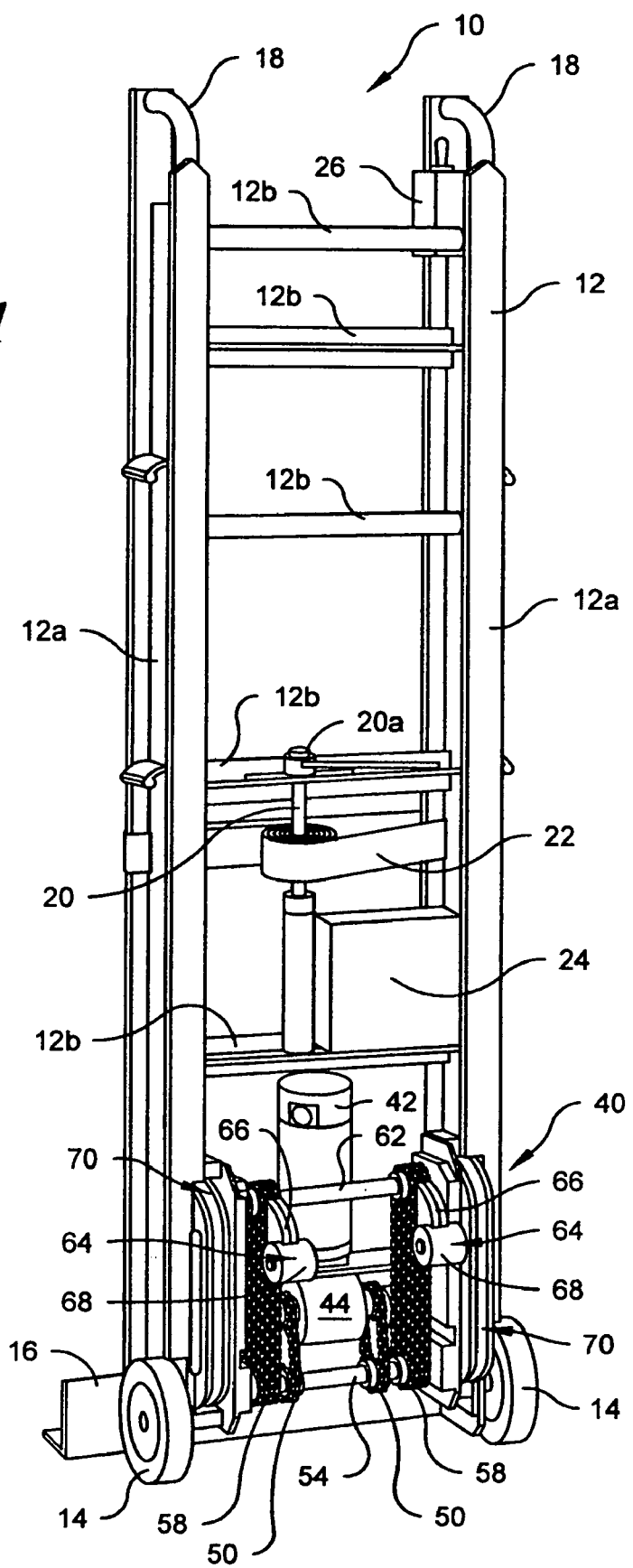
FIG. 1 is a left rear perspective view of a hand truck having a stair climbing mechanism in accordance with a preferred embodiment of the present invention.

Certain terminology is used in the following description for convenience only and is not limiting. The words "right," "left," "upper," and "lower" designate directions in the drawings to which reference is made. The terminology includes the words above specifically mentioned, derivatives thereof, and words of similar import.

Referring to the drawings in detail, wherein like numerals indicate like elements throughout, there is shown in FIGS. 1–4 a preferred embodiment of a stair climbing hand truck, indicated generally at 10, in accordance with the present invention. Referring to FIG. 1, the hand truck 10 includes a generally ladder-like frame 12. The frame 12 includes at least two uprights 12a, one on either side of the frame 12, and a plurality of cross members 12b extending generally perpendicularly between the uprights 12a. Proximate a first end of the frame 12 are a pair of handles 18 to enable grasping of the hand truck 10 during use. At least two wheels 14 are rotatably engaged with the frame 12 proximate a second end of the frame 12. Preferably, the wheels 14 extend outwardly from the uprights 12a of the frame 12 and enable the hand truck 10 to be rolled along a surface (not shown). Extending outwardly from a front of the frame 12 proximate the second end is a lifting surface or platform 16. Preferably, at least a portion of the platform 16 extends generally perpendicularly from the front of the frame 12 to enable the transportation of an object such as a box 34 (see FIGS. 4A–4D).

Preferably, the hand truck 10 has a ratchet 20 engaged therewith for the loosening and tightening of a strap 22 spooled thereon. The ratchet 20 is preferably rotatably mounted between two adjacent cross members 12b. The strap 22 is loosened and tightened using a ratchet handle 20a to unspool the strap 22 from or spool the strap 22 onto the ratchet 20, respectively. Preferably, the strap 22 is used to secure objects such as the box 34 to the hand truck 10 to inhibit objects from falling off of the hand truck 10.

Figure 2:
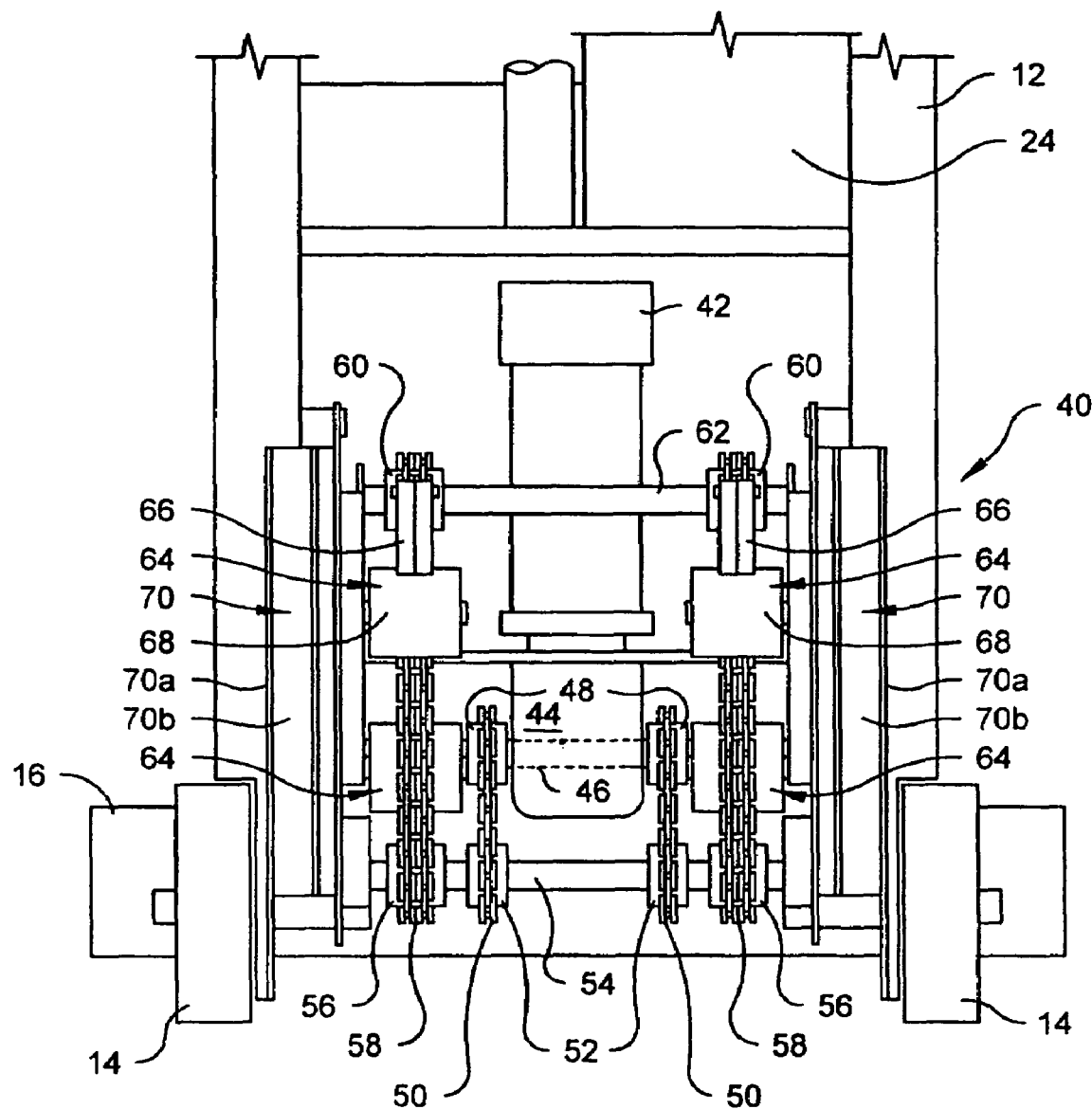
FIG. 2 is an enlarged rear elevational view of a portion of the stair climbing mechanism of the hand truck of FIG. 1.
Figure 3:
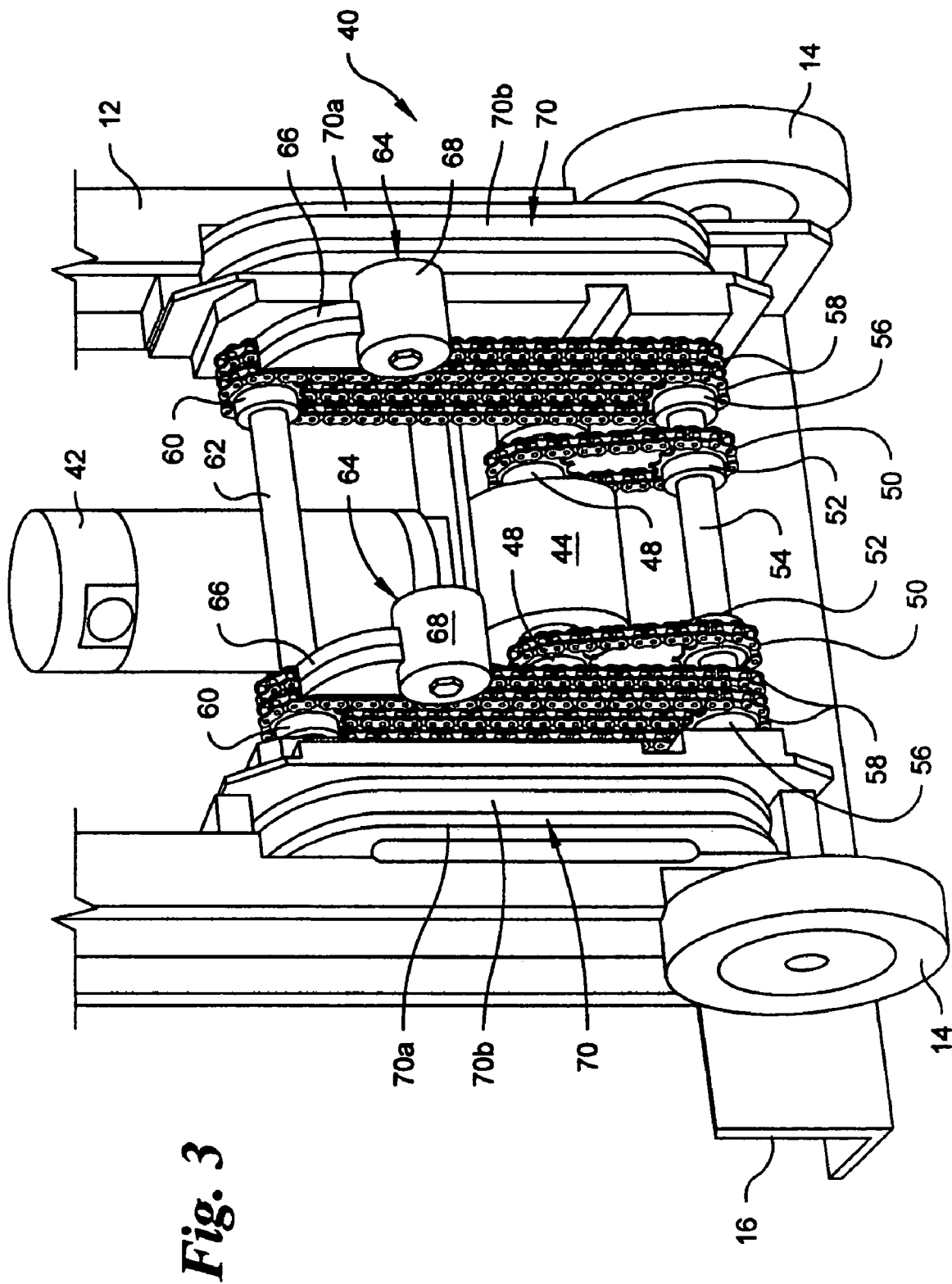
FIG. 3 is an enlarged left rear perspective view of a portion of the stair climbing mechanism of FIG. 2.

Referring to FIGS. 2 and 3, the hand truck 10 has a stair climbing mechanism 40 engaged thereto. Preferably, the stair climbing mechanism 40 is disposed proximate the second end of the frame 12. Driving the stair climbing mechanism 40 is a motor 42 powered by a power source.

Preferably, the motor 42 is an electric motor and the power source 24 is a battery. Although it is preferable that the motor 42 be powered by electricity, it is within the spirit and scope of the present invention that the motor 42 be powered by something other than electricity, such as natural gas or gasoline, for instance. The hand truck 10 also has a control or a switch 26 (see FIG. 1) for selectively powering the motor 42 using the power source 24, for example, by closing an electrical circuit between the motor 42 and the battery 24 to power the motor 42. In this way, the stair climbing mechanism 40 is selectively powered.

Drivingly connected to the motor 42 is an output shaft 46. It is preferable that the output shaft 46 extends through a gear box 44, which is directly drivingly engaged with the motor 42, with each end of the output shaft 46 extending outwardly from opposite sides of the gear box 44. Preferably, the gear box 44 includes a speed reduction gear train therein to prevent the motor 42 from being back-driven. That is, although the motor 42 is able to drive the output shaft 46 when powered, the output shaft 46 is unable to rotate when the motor 42 is unpowered. Simply put, although the motor 42 can drive the output shaft 46, the output shaft 46 cannot drive the motor 42. This is preferably accomplished using a worm gear (not shown) within the gear box 44, although it is within the spirit and scope of the present invention that there be an alternate mechanism for preventing the motor 42 from being back-driven.

Fixedly mounted to the ends of the output shaft 46 are first sprockets 48. First chains 50 rotatably attach the first sprockets 48 to second sprockets 52, which are fixedly engaged to a lower first shaft 54 extending generally from one upright 12a to the other upright 12a of the frame 12, the first shaft 54 being generally perpendicular to the uprights 12a. Also fixedly engaged with the lower first shaft 54 are two third sprockets 56, preferably disposed outwardly from the second sprockets 52. Disposed upwardly from the lower first shaft 54 is a rotatable upper second shaft 62, generally parallel to the first shaft 54. Fixedly engaged with the second shaft 58 are two fourth sprockets 60.

The upper second shaft 62 is rotatably coupled with the lower first shaft 54 by at least two rotatable endless loop drive elements or second chains 58 running from the two third sprockets 56 to the two fourth sprockets 60. That is, at least one second chain 58 is wrapped from each third sprocket 56 to the corresponding fourth sprocket 60, such that rotation of the first shaft 54 drives the second chains 58 and causes rotation of the second shaft 62 with each of the second chains 58 traveling in a generally elliptical path about the upper second shaft 62 and the lower first shaft 54. Preferably, each side has two second chains 58, as shown in FIGS. 2 and 3, such that there are a total of four second chains 58 disposed between the first and second shafts 54, 62. Although it is preferable to have four second chains 58, it is within the spirit and scope of the present invention to have more or less than four second chains 58, such as one second chain 58 per side, for instance. Each of the second chains 58 is generally parallel with respect to each of the other second chains 58, and all of the second chains 58 are generally perpendicular to the first and second shafts 54, 62. In this way, the output shaft 46 drives the first shaft 54 and, consequently, the second chains 58. Although portrayed as chains, it is within the spirit and scope of the present invention that alternative drive elements be used with the stair climbing mechanism 40, such as belts, for instance.

Each second chain 58 includes at least one abutment member 64 engaged therewith and extending outwardly therefrom. The abutment members 64 are disposed on the second chains 58 to rotate therewith, such that the abutment members 64 also travel in a generally elliptical path with the second chains 58. Each abutment member 64 includes an extension arm 66 and a generally cylindrical foot 68. The extension arm 66 extends outwardly from the second chain 58 such that the abutment member extends rearwardly from the back of the stair climbing mechanism 40 along at least a portion of its path. Mounted to the end of each extension arm 66 is the foot 68. Preferably the feet 68 are made of rubber or have a rubber material disposed around them for enhanced grip between the feet 68 and a surface.

Preferably, each of the second chains 58 has at least two abutment members 64 extending therefrom which are equidistantly spaced about each second chain 58, such that there are at least two pairs of abutment members 64. When the motor 42 drives the second chains 58, the abutment members 64 each rotate around the generally elliptical path of the second chains 58. The abutment members 64 of each pair of abutment members 64 are synchronized with each other such that the first pair of abutment members 64 travels around the top of the path when the second pair of abutment members 64 travels around the bottom of the path. This synchronization is accomplished because each of the second chains 58 is the same length and all of the third and fourth sprockets 56, 60 are of the same diameter and have the same number of teeth. In this way, so long as the second chains 58 do not slip on the sprockets 56, 60 and provided the abutment members 64 of each pair are initially aligned with each other, the abutment members 64 of each pair will remain synchronized with each other during operation of the stair climbing mechanism 40.

Each of the abutment members 64 extends outwardly from the second chains 58 sufficiently so as to interact with the stairs 30 (see FIG. 4) in order to lift the hand truck 10 up the stairs 30, as will be described below. Although portrayed as having two abutment members 64 engaged with each of the second chains 58, it is within the spirit and scope of the present invention that there be more or less than two abutment members 64. Additionally, although it is preferable to have cylindrical, rubberized feet 68, it is within the spirit and scope of the present invention that the feet 68 have a different shape, such as prismatic, for instance, and that the feet 68 be made of a substance or have a coating other than rubber.

The stair climbing mechanism 40 also includes generally oval rollers 70 engaged with and extending rearwardly from the frame 12. The roller assemblies 70 are generally well known in the industry and include an ovular or elliptical housing 70a and a rotatable belt 70b encased within the housing 70a. The roller assemblies 70 allow the user 32 to pull the hand truck 10 up and/or over small obstacles such as stairs and bumps as well as acting to facilitate the climbing of a flight of stairs 30 (see FIG. 4), as will be described below.

Preferably, the majority of the components of the hand truck 10 are made of metal. For instance, the frame 12 is preferably made of aluminum, and the shafts 54, 62 and sprockets 48, 52, 56, 60 are preferably made of steel. Although this is preferred, it is not intended to be limiting, and it is within the spirit and scope of the present invention that the components of the hand truck 10 be made of any suitable material which allows the hand truck 10 to function as described herein.

Referring now to FIGS. 4A–4D, in use, the user 32, using the hand truck 10 to transport an object such as the box 34 can use the stair climbing mechanism 40 to climb the flight of stairs 30. The user 32 preferably sufficiently unspools the strap 22 from the ratchet 20 to wrap the strap 22 around the box 34 to be transported and tightens the strap 22 using the ratchet 20 to secure the box 34 to the hand truck 10, inhibiting the box 34 from falling off of the hand truck 10. The user 32 pulls the hand truck 10 along a surface and proximate a first stair 30a, preferably so that the roller assemblies 70 abut an edge of the first stair 30a. The user then powers the motor 42 by toggling the switch 26 to an on position. Doing so causes actuation of the motor 42 which drives the abutment members 64 around their elliptical paths along the second chains 58. The first pair of abutment members 64 rotate around the upper second shaft 62 to extend rearwardly from the back of the hand truck 10 and begin a downward portion of the path of motion of the abutment members 64. Referring specifically to FIG. 4A, because the hand truck 10 is pulled sufficiently close to the first stair 30a, the first pair of abutment members 64 abut a top surface 30b of the first stair 30a and push against it. As the first pair of abutment members 64 continue along the generally elliptical path, the first pair of abutment members 64 effectively push downwardly on the top surface 30b of the first stair 30a to lift the hand truck 10 up the first stair 30a, as shown in FIG. 4B. As the first pair of abutment members 64 reach the bottom of their paths, as shown in FIG. 4C, the wheels 14 are brought into contact with the top surface 30b of the first stair 30a. The user 32 can then pull the hand truck 10 along the top surface 30b of the first stair 30a so that the hand truck 10 is proximate a second stair 30c. At this time, it is preferable that the second pair of abutment members 64 begin rotating about the upper second shaft 62 in order to come into contact with a top surface 30d of the second stair 30c. As shown in FIG. 4D, the second pair of abutment members 64 abut the top surface 30d of the second stair 30c and begin lifting the hand truck 10 up the second stair 30c in the same way a described above. This process is repeated for each stair in the flight of stairs 30 until the hand truck 10 has reached the top of the flight of stairs 30. The roller assembly 70 assists in lifting the hand truck 10 up the flight of stairs 30 by allowing the back of the stair climbing mechanism 40 to slide along edges of the stairs with minimal frictional resistance. In this way, the stair climbing mechanism 40 allows for power assisted stair climbing of the hand truck 10.

Although stair climbing is described above, it is within the spirit and scope of the present invention that the stair climbing mechanism 40 be used for power-assisted stair descending. This is accomplished by reversing the direction of rotation of the motor 42 to enable the abutment members 64 to travel in an opposite path (i.e., the abutment members 64 traveling upwardly when extending rearwardly from the back of the hand truck 10). The user 32 can then use the stair climbing mechanism 40 to descend a flight of stairs 30 by positioning the hand truck 10 proximate an edge of a top stair such that the abutment member 64 will abut a top surface of the top stair and lower the hand truck 10 to the next lower stair, generally reversing the above-described process of stair climbing.

Because the output shaft 46 of the stair climbing mechanism 40 of the hand truck 10 has two ends which are each drivingly connected to the lower first shaft 54, should one of the first chains 50 fail or become otherwise inoperable, the stair climbing mechanism 40 is able to continue to operate because the output shaft 46 is still drivingly connected to the lower first shaft 54 with the other first chain 50 at the other end of the output shaft 46. That is, in the event that one of the first chains 50 of the stair climbing mechanism 40 fails, the hand truck 10 should not be rendered powerless. Instead, the hand truck 10 should continue to climb the flight of stairs 30 and should not free fall down the flight of stairs 30, thereby guarding against a dangerous situation to any bystanders who happen to be disposed below the hand truck 10 at the time of a failure.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention.

I claim:

1. A hand truck for climbing stairs, the hand truck comprising:
    a frame having handles proximate a first end and at least two freely rotatable wheels proximate a second end, the frame further having a lifting surface extending outwardly from the frame proximate the second end; and
    a stair climbing mechanism engaged with the frame proximate the second end and having:
        a motor
        an output shaft drivingly connected to the motor, the output shaft having two ends;
        at least two rotatable endless loop drive elements generally parallel with respect to each other, the drive elements being drivingly connected to each of the ends of the output shaft;
        each drive element including at least one abutment member engaged with and extending outwardly therefrom, whereby the motor drives the drive elements to cause rotation of the abutment members, the abutment members interacting with the stairs to lift the hand truck up the stairs, the drive elements of the stair climbing mechanism each being rotatable about an upper shaft and a lower shaft, each of the upper and lower shafts extending between and generally transverse to the drive elements; and
    at least two intermediate endless loop drive elements coupling each end of the output shaft with the lower shaft so that rotation of the output shaft causes rotation of the lower shaft to drive the drive elements around the upper and lower shafts even if one of the intermediate drive elements were to fail.

2. The hand truck of claim 1 wherein the intermediate drive elements are chains.

* * * * *